(12) United States Patent
Flavin et al.

(10) Patent No.: US 6,219,788 B1
(45) Date of Patent: Apr. 17, 2001

(54) WATCHDOG FOR TRUSTED ELECTRONIC CONTENT DISTRIBUTIONS

(75) Inventors: Robert Alan Flavin, Yorktown Heights; Perwaiz Nihal, Fishkill; Ronald Perez, Mount Kisco; Sean William Smith, Cornwall, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/078,671

(22) Filed: May 14, 1998

(51) Int. Cl.⁷ .................................................. G06F 11/30
(52) U.S. Cl. .......................... 713/194; 713/200; 380/202; 380/203; 348/7; 348/10; 705/51; 705/53
(58) Field of Search ................................. 348/7, 1, 8, 10, 348/152, 385, 143, 150; 395/226, 210; 713/200, 160, 201, 170, 176, 202, 194; 380/255, 202, 239, 203, 281, 204, 283, 284; 705/10, 26, 51, 53, 64, 67, 68, 69, 75, 76, 80; 455/2

(56) References Cited

U.S. PATENT DOCUMENTS

| | | | |
|---|---|---|---|
| 4,602,279 | * 7/1986 | Freeman | 358/86 |
| 5,144,663 | * 9/1992 | Kudelski et al. | 380/16 |
| 5,216,515 | 6/1993 | Steele et al. | |
| 5,231,494 | * 7/1993 | Wachob | 358/146 |
| 5,359,508 | * 10/1994 | Rossides | 364/401 |
| 5,515,098 | * 5/1996 | Carles | 348/8 |
| 5,724,521 | * 3/1998 | Dedrick | 705/26 |
| 5,774,534 | * 6/1998 | Mayer | 379/142 |
| 5,838,790 | * 11/1998 | McAuliffe et al. | 743/176 |

OTHER PUBLICATIONS

The Patent Office of the UK Search Report dated Oct. 27, 1999 for GB 9906344.8.
J. Schick, "AdJuggler", available via the internet at: http://www.designshops.com/pace/ds/pub/98/04/17/tools/adjuggler.html, pp. 1–4, Apr. 17, 1998.
"NetGravity Launches AdServer 3.0", available via the internet at: http://www.netgravity.com/press/announce30.html, pp. 1–3, Mar. 11, 1997.

* cited by examiner

Primary Examiner—James P. Trammell
Assistant Examiner—Pierre Eddy Elisca
(74) Attorney, Agent, or Firm—Louis P. Herzberg

(57) ABSTRACT

A computer watchdog system monitors and controls distribution content sent form producers, through distributors, to subscribers. The computer watchdog system acting to ensure the just execution of agreements between a producer of content and a distributor of content. The computer watchdog system serving as an agent trusted by both producers and distributors. The computer watchdog system may be equipped with tamper protection for resisting exogenous attempts to gain unauthorized access to the system. The computer watchdog system may be installed entirely within distributor's sites. Alternatively, the computer watchdog system may reside partially within distributor's sites and partially within subscriber's sites. The computer watchdog system logs and reports on information relating to the distribution of content. Further, the computer watchdog system may selectively transform content provided by a producer, customizing the content for distributors and subscribers.

29 Claims, 6 Drawing Sheets

WATCHDOG FOR TRUSTED ELECTRONIC CONTENT DISTRIBUTIONS

FIELD OF THE INVENTION

The present invention relates to electronic content distribution and more particularly to a computer watchdog system providing a secure communication channel. Specifically, a system is described for securing the distribution of electronic content from a producer, through a distributor, to a subscriber.

BACKGROUND OF THE INVENTION

Before proceeding it is helpful to define the following terms:

Content: any material that is possible to distribute electronically to consumers, such as, for example, advertisements, movies, recorded music, world wide web pages, or the like. Electronic content refers to material that may be distributed digitally, such as, for example, sampled music, digital video, or the like.

Producers: makers of content, such as, for example, an advertiser, an actor, a movie production company, a music production company, or the like.

Distributors: owners of communication channels, such as, satellite companies, cable-TV companies, telephone companies, Internet access providers, or the like.

Subscribers: members of the general public that are consumers of content, such as, individuals receiving cable-TV, individuals with access to the Internet, or the like.

Viewer: a device, such as, for example, a personal computer and/or work station, used to view content, visually as well as audibly.

Many producers of electronic content provide electronic content to various content distributors. The content distributors, in turn, select and route electronic content to subscribers. For example, a producer of electronic content may be an advertiser providing national advertisements to local cable-TV distributors. The local cable-TV heads, in turn, select national advertisements provided by the advertiser, insert these national advertisements into the local cable-TV programming, and provide the programming with the inserted advertisements to cable subscribers. FIG. 1 is a block diagram illustrating the distribution of advertisements from several advertisers 102, 104, and 106, through a content distributor 110, to subscribers 120, 122, 124, 126, and 128.

Payment agreements between a producer of content and a distributor of content depend on the content that is received by subscribers. The content received by subscribers may be classified as either "art" or "advertising". When the content received by subscribers is deemed "art" the content distributor pays the content producer per distribution of content to subscribers. When the content received by subscribers is deemed "advertising" the content producer pays the content distributor per distribution of content to subscribers.

For example, suppose video is the medium by which content is distributed. Pay-per-view movies in hotel rooms received via cable and/or satellite links is content that is deemed "art". In this case, the cable and/or satellite company is the content producer, the hotel is the distributor of pay-per-view movies, and subscribers, receiving these movies, are the hotel occupants. An example of video received by subscribers that is deemed "advertising" is the example given above in which a distributor selects and inserts national advertisements in local cable-TV programming.

In the case where the medium by which content is distributed is the world wide web, an example of content that is deemed "art" is a retail site offering digitized music for sale. In this case, the owner of the rights to the digitized music is the content producer, the owner of the retail site is the content distributor, and anyone with access to the Internet is a potential subscriber. An example of content distributed over the world wide web that is deemed "advertising" is advertisements appearing in on-line newspapers and/or magazines. In this case, the content producer is the advertiser, the distributor is the owner of the on-line magazine and/or newspaper, and a subscriber is anyone with access to the on-line magazine and/or newspaper. FIG. 2 is a block diagram illustrating the distribution of content from producers 202, 204, 206, 208, and 210, through distributors 220, 222, and 224, to subscribers 230, 232, 234, 236, 238, 240, and 242.

The infrastructure conventionally used to distribute content from producers, through distributors, to subscribers is shown in FIG. 3. FIG. 3 shows: a producer's site 302, a distributors site 310, content distribution channels 320, and subscriber's sites 322, 324, and 326. The producer's site 302 includes a preparation engine 303 for packaging electronic data in preparation for distribution. The distributors site 310 includes: a content receiver 312, a device for receiving content provided by a producer; a content archive 314, a device for storing data (e.g. digital music, video, and/or advertisements); a distribution engine 316, a mechanism for determining when and what content to distribute to a subscriber 322, 324, and/or 326 via the content distribution channels 320; and a bypass 318, for bypassing the content archive 314, sending content directly from the content receiver 312 to the distribution engine 316. Both the content receiver 312 and the distribution engine 316 may communicate with the content archive 314. The subscriber's sites 322, 324, and 326, each include a viewer for viewing multimedia data.

A fundamental difficulty with the distribution of content as illustrated in FIG. 3 is that in order to comply with the payment agreements between a producer of content and a distributor of content, a trustworthy measurement of the content received by subscribers is required. It may be possible to alter the distribution infrastructure to accommodate measurements of content received by subscribers. A measurement of content received by a subscriber may be, for example, the number of pay-per-view movies watched, the number of musical pieces downloaded from the Internet, and/or the number of times a particular on-line magazine was accessed. The content distributor may measure the content received by subscribers. Alternatively, meters may be introduced at subscriber sites in order to allow a content producer to measure content received by subscribers. In either case, the content producer and content distributor need to trust one another. Either the content producer or the content distributor may, through malice and/or by bungling, skew the measurement results. For example, with content deemed "advertising" the distributor may increase his revenue by pretending to distribute content to a large number of subscribers. Another example of fraud by content distributors, such as a TV or radio broadcasting company, occurs when the distributor miscalculates the residual royalties due performers (content producers) appearing in, for example, advertisements.

SUMMARY OF THE INVENTION

A computer watchdog system processes a producer set. The producer set is provided by a producer. The computer watchdog comprises: a processing engine for creating a plurality of records of distribution content and for generating a plurality of reports based on the producer set; a distribution log for storing the plurality of records of distribution content; and an authenticated execution unit for validating a set of operations performed by the processing engine and transmitting an authenticating signal responsive to said set of operations being validated.

DETAILED DESCRIPTION OF THE INVENTION

Figure 1:
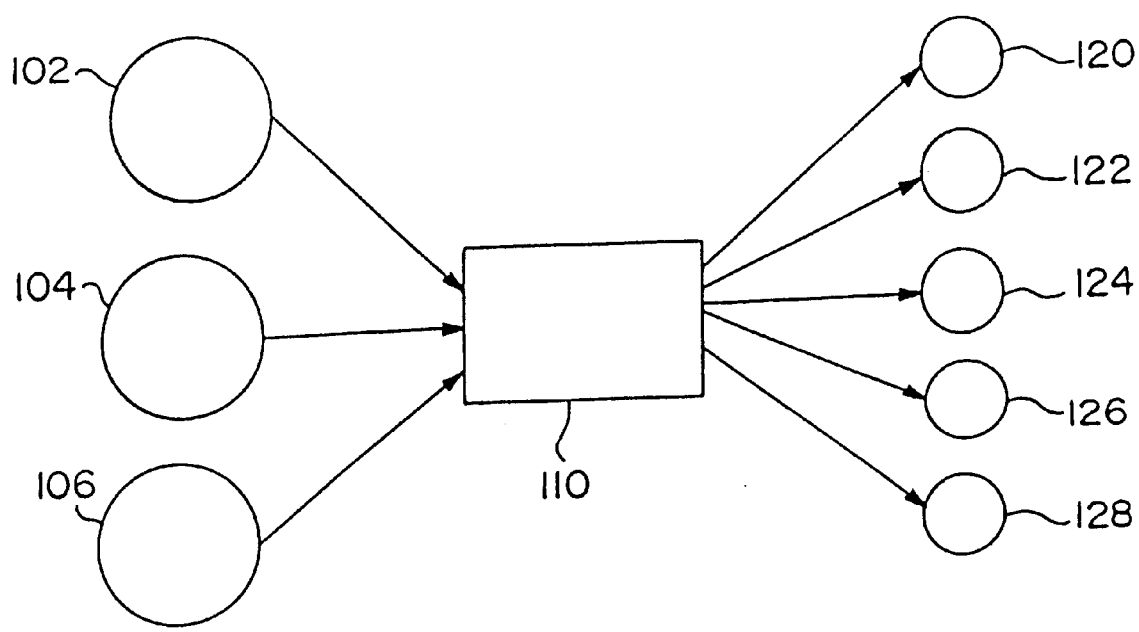
FIG. 1 is a block diagram illustrating the distribution of advertisements from an advertiser, through a content distributor, to subscribers.
Figure 2:
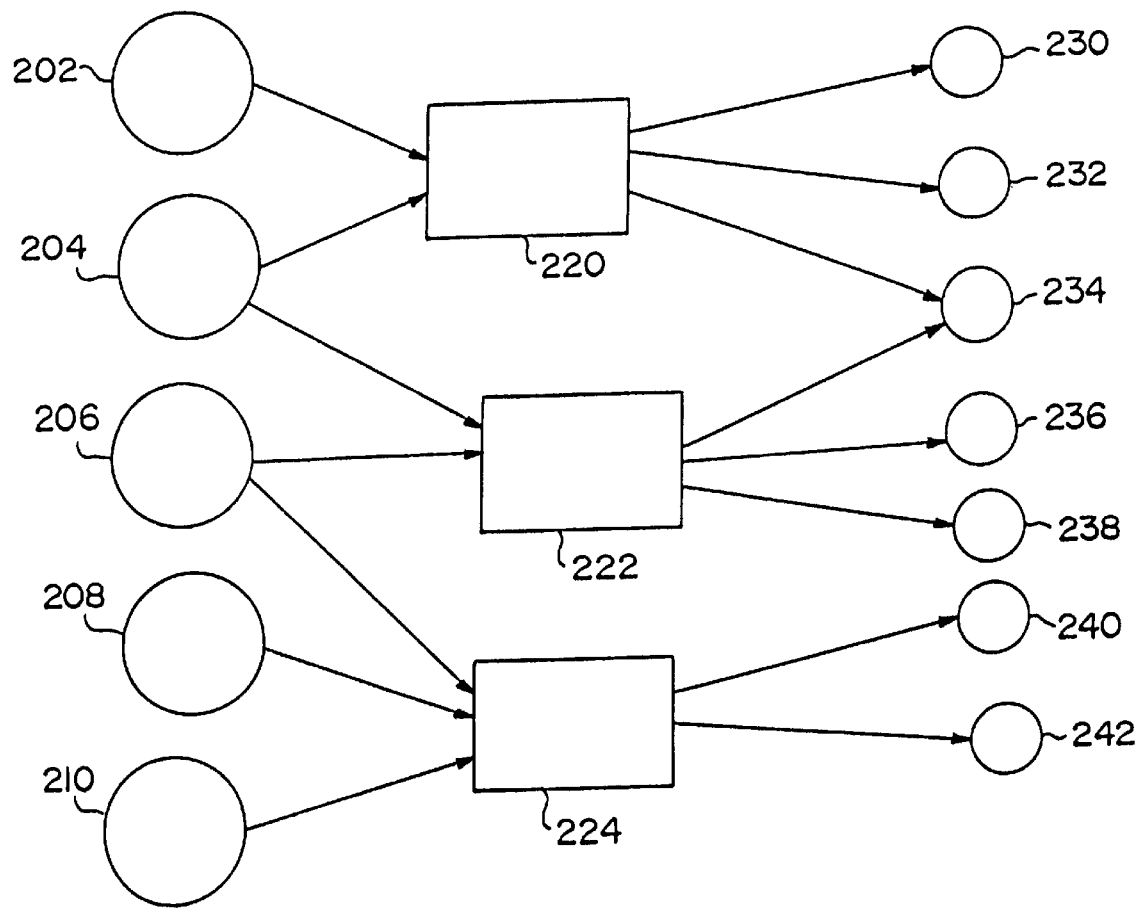
FIG. 2 is a block diagram illustrating the distribution of content from producers, through distributors, to subscribers.
Figure 3:
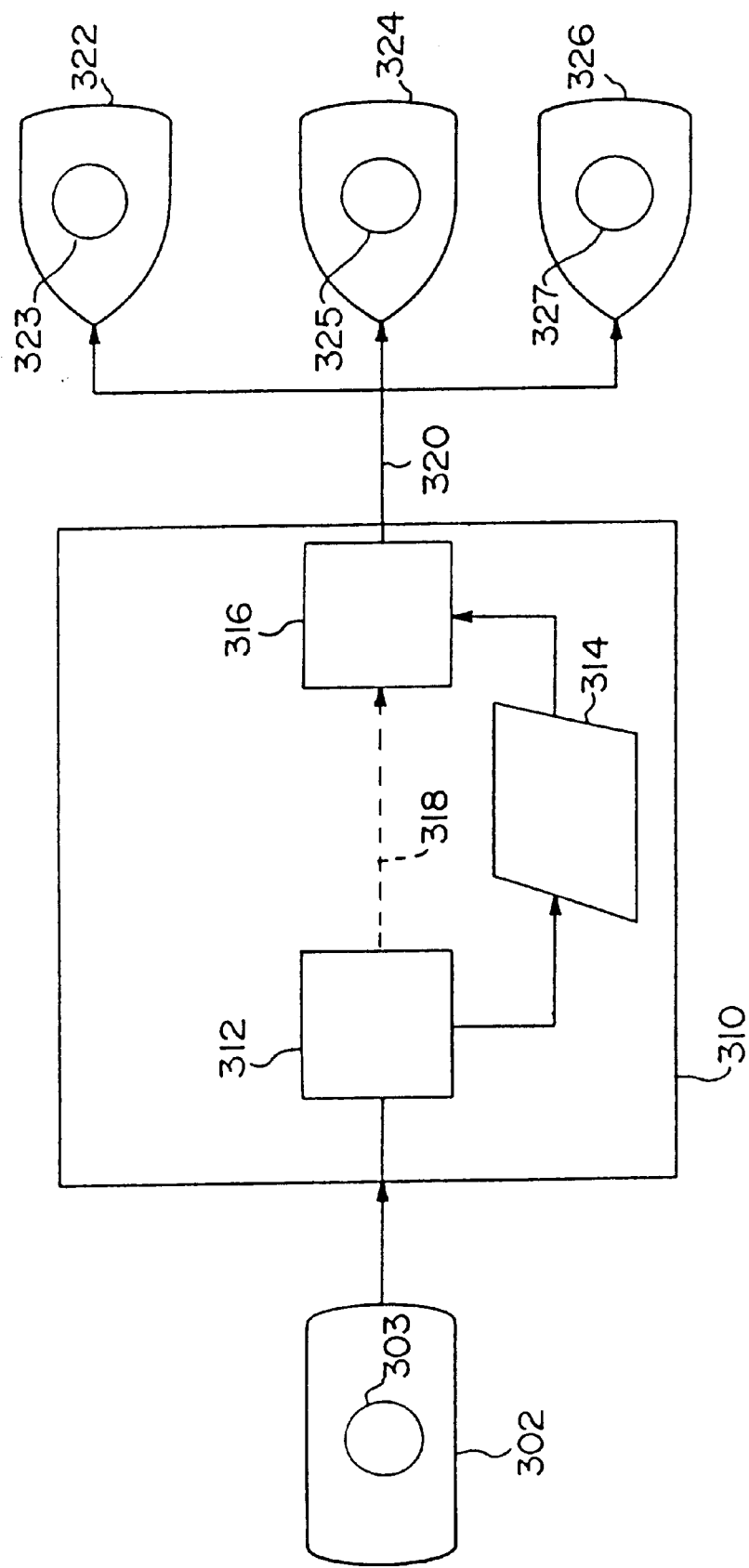
FIG. 3. is a block diagram which is helpful in understanding the infrastructure conventionally used to distributed content from producers, through distributors, to subscribers.

Before proceeding it is helpful to define the following terms:

Computer watchdog system: a system that may be implemented in hardware, software or both for monitoring and controlling electronic content distributed from a producer, through distributors, to subscribers. The system enforces the just execution of distribution agreements between producers and distributors of content.

Records of distribution content: records that may include unique identifiers of the content. These records may also include information that a producer and/or a distributor may want to verify concerning the distribution of content. For example, the date and time the data had been received and/or distributed, the size of the data, the length (in time) of data transmission, the format of the content (e.g. TV transmission, music, or the like), the identity of the distributor, the identity of subscribers, and information relating to the customizing of data for both distributors and subscribers, may be included in the records.

Distribution log: a log containing records of distribution content.

Processing Engine: a computer including a central processing unit, a memory, and an input/output interface.

Archive: a device for storing data.

Authenticated execution unit: cryptographic means allowing the watchdog to determine the validity of programs, that either reside in the watchdog or are sent to the watchdog by a producer or by a distributor, to be executed by the processing engine. Once validity is established the watchdog may authenticate the operations performed by the processing engine to a producer or distributor at a remote location.

Reports: include information ranging from the entire contents of the distribution log, to a subset of the information that is requested, by a producer and/or a distributor, from a computer watchdog system. For example, a report may include all pertinent information regarding one particular piece of data that the producer sent to the distributor; e.g. content X received by distributor Y, content X archived at Z time, content X distributed to subscriber S, content X removed from archive.

Tamper protection: any mechanism for protecting against unauthorized access to the information stored in, and the operation of the computer watchdog system. Tamper protection may include logic and other circuitry to detect, for example, temperature and voltage changes that are outside of a pre-specified operating range. The presence of X-rays, and/or physical intrusion (e.g. mesh intrusion) through the outer layers (skin) of the watchdog, may also be detected.

The safety and security of distribution of content from a producer, through distributors, to subscribers may be enforced by a computer watchdog system. A computer watchdog system may be installed at the distributors site or location. The watchdog will monitor and control information related to the distribution of content, provided by a producer, and delivered (distributed) to subscribers by the distributor. The watchdog may thus serve as an agent that is trusted by both producers and distributors. The processing operations of the watchdog facilitate the implementation of agreements between a producer and a distributor, by providing each with relevant trustworthy information concerning content and its distribution. The watchdog may be designed to carry out the monitoring and control operations justly while resisting exogenous attempts at tampering.

Figure 4:
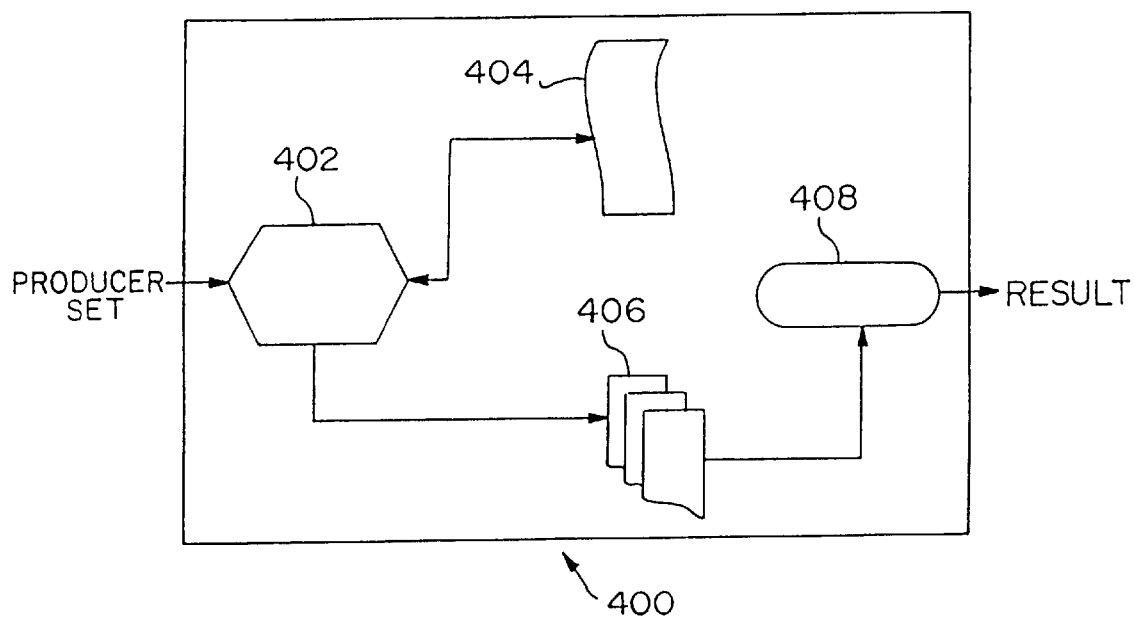
FIG. 4 is an illustration of an exemplary watchdog in accordance with an exemplary embodiment of the present invention.

An exemplary watchdog 400 in accordance with a first embodiment of the present invention is shown in FIG. 4. The watchdog 400 includes: a processing engine 402, a distribution log 404, and an authenticated execution unit 408. The processing engine 402 receives a producer set provided by a producer. The processing engine 402 creates a plurality of records of distribution content from the producer set. These records may be stored in the distribution log 404. By processing the records of distribution content, and the information stored in the log 404, the processing engine 402 may generate a plurality of reports 406 containing pertinent information.

For example, a producer set may contain formatted and electronically packaged data that the producer has sent to a distributor, as well as information that a producer wishes the watchdog to store in a distribution log. Such electronically packaged data may contain, for example, a TV advertisement, as well as a time-stamp that indicates the time the advertisement was sent to the distributor, and the size of the advertisement. Records of distribution content such as a time-stamp and size information allow a watchdog to report to a producer the length of time it take the distributor to receive data, and to verify that all the data had been received by the distributor. A processing engine may parse the data to create and log such records of distribution content in the distribution log. Furthermore, the processing engine may, accessing the log, generate a plurality of reports containing information that is pertinent to the producer and/or distributor.

The distribution log 404 contains records of the content, of a producer set, received and/or distributed by a distributor. These records of distribution content may include unique identifiers of the content. The records may also include information that a producer and/or a distributor may want to verify concerning the distribution of content. For example, the date and time the data had been received and/or distributed, the size of the data, the length (in time) of data transmission, the format of the content (e.g. TV transmission, music, or the like), the identity of the distributor, the identity of subscribers, and information relating to the customizing of data for both distributors and subscribers, may be included in the records.

The plurality of reports 406 may include information ranging from the entire contents of the distribution log, to a subset of the information that is requested, by a producer and/or a distributor, from the watchdog 400. For example, one report of the plurality of reports 406 may include all pertinent information regarding one particular piece of data that the producer sent to the distributor; e.g. content X received by distributor Y, content X archived at Z time, content X distributed to subscriber S, content X removed from archive.

The authenticated execution unit 408 may be implemented in software that resides in the watchdog 400. The authenticated execution unit 408 lends the watchdog 400 the capability to determine the validity of programs, that either reside in the watchdog 400 or are sent to the watchdog 400 by a producer or by a distributor, to be executed by the processing engine 402. Hence, the authenticated execution unit 408 may prevent unauthorized software from being run by the watchdog 400. The authenticated execution unit 408 may also prevent the counterfeiting and/or forgery of the watchdog 400 by a device attempting to masquerade as the watchdog 400. The operations performed by the processing engine 402 may be validated by the authenticated execution unit 408 by verifying a digital signature against a certificate containing a cryptographic key. Hence, the watchdog may authenticate the operations performed by the processing engine to a producer or distributor at a remote location. For example, an authenticated execution unit may include the ability to control when and how the watchdog 400 receives software updates, and the ability to authenticate messages from the watchdog 400 to a remote device.

A trustworthy watchdog may be designed to be resistant to exogenous tampering. Tamper protection may include logic and other circuitry to detect, for example, temperature and voltage changes that are outside of a pre-specified operating range. The presence of X-rays, and/or physical intrusion (e.g. mesh intrusion) through the outer layers (skin) of the watchdog, may also be detected. The watchdog may respond to an attempt at tampering by "zero-izing" (erasing) memory that is otherwise non-volatile. The memory to be "zero-ized" when a tampering attempt is sensed, may contain secret cryptographic keys and other information that allows a watchdog to authenticate itself and the resident software. In other words, tamper protection renders some subset of the memory unavailable, either by destroying it ("zero-ization") or by making it physically unavailable. "Zero-ization" may not destroy the contents of a watchdog's memory, but rather destroy the ability of a watchdog to (cryptographically) prove that it is authentic. For example, tamper protection employed by a watchdog may be designed to meet or exceed the requirements of the US government's FIPS 140-1 standard for a level 4 cryptographic module. Tamper protection prevents unauthorized access to the contents of a watchdog.

A watchdog with tamper protection may be referred to as an untampered device. An un-tampered device is a watchdog that is able to authenticate itself to a producer, for example, as a valid watchdog, running authenticated software; i.e. all secret cryptographic keys and information are intact. A computer watchdog system as described in the foregoing may be implemented, for example, using the IBM 4758 cryptographic coprocessor executing software that may be developed using IBM 4758's OEM development environment.

Figure 5:
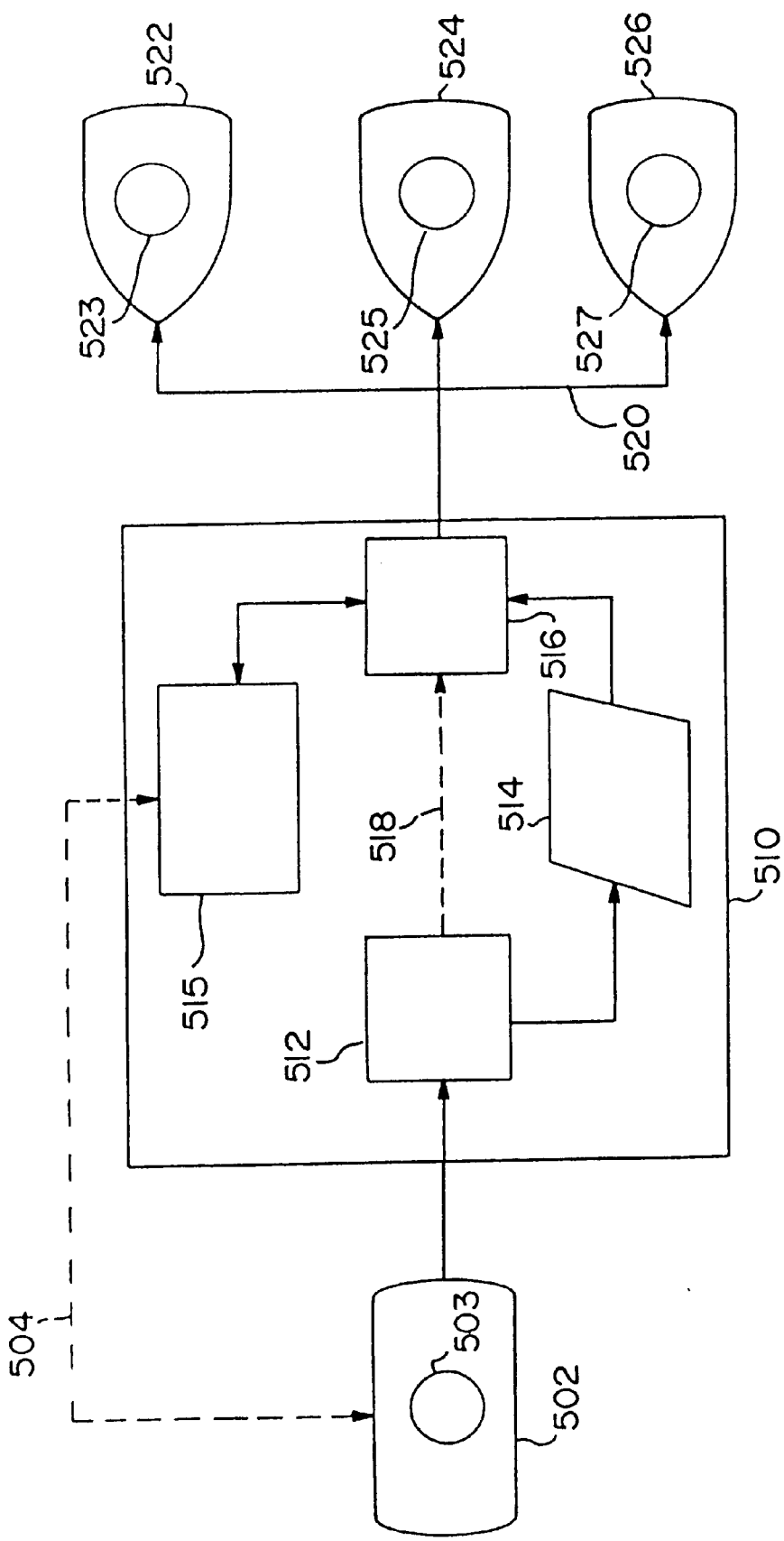
FIG. 5 is a block diagram which illustrates an infrastructure used to distribute content from producers, through distributors, to subscribers in accordance with an exemplary embodiment of the present invention.

The infrastructure used to distribute content from producers, through distributors, to subscribers in accordance with another embodiment of the present invention is shown in FIG. 5. FIG. 5 shows: a producer's site 502, a distributors site 510, content distribution channels 520, and subscriber's sites 522, 524, and 526. The producer's site 502 includes a preparation engine 503, for packaging electronic data in preparation for distribution. The distributors site 510 includes: a watchdog 515, a content receiver 512, a device for receiving content provided by a producer; a content archive 514, a device for storing data (e.g. digital music, video, and/or advertisements); a distribution engine 516, a mechanism for determining when and what content to distribute to a subscriber 522, 524, and/or 526 via the content distribution channels 520; and a bypass 518, for bypassing the content archive 514, sending content directly from the content receiver 512 to the distribution engine 516. Both the content receiver 512 and the distribution engine 516 may communicate with the content archive 514. The watchdog 515 communicates with the distribution engine 516. The subscriber's sites 522, 524, and 526, each include a viewer for viewing multimedia data. FIG. 5 also shows a watchdog-producer loop 504. The loop 504 is a communication path through which a producer may query the watchdog 515 concerning the verification of information in the plurality of reports generated by the watchdog 515.

Once content has been packaged by the preparation engine 503 at the producer's site the producer sends a producer set to a distributor. The producer set is received by the content receiver 512. The distribution content of the producer set may then be stored in the content archive until a decision is made to distribute the content. Alternatively, the distribution content may be forwarded directly to the distribution engine 516 using the bypass 518. Once the decision is made to distribute content the distribution engine 516 notifies the watchdog 515 of the content to be distributed. The watchdog 515 may then log all the information that is relevant to the current distribution of content. The distribution content is then distributed to subscribers 522, 524, and/or 526, via the content distribution channels 520. The subscribers 522, 524, and/or 526, receive the content or data.

Figure 6:
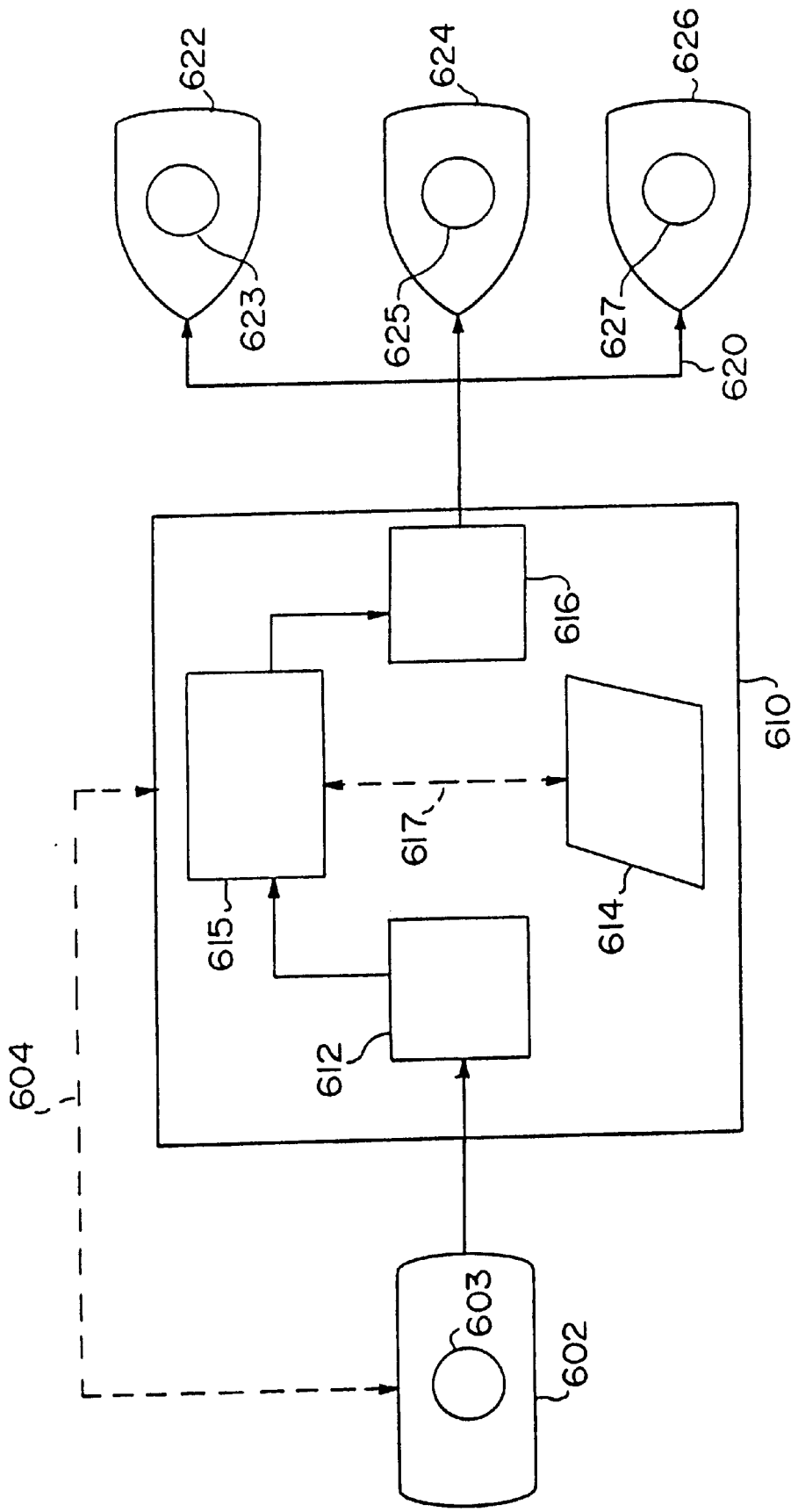
FIG. 6 is a block diagram which illustrates an infrastructure used to distribute content from producers, through distributors, to subscribers in accordance with an exemplary embodiment of the present invention.

In variation to the embodiment, in accordance with the present invention, shown in FIG. 5, an infrastructure to distribute content from producers, through distributors, to subscribers as shown in FIG. 6 may be used. The distributors site 610 includes: a watchdog 615, a content receiver 612, a device for receiving content provided by a producer; a content archive 614, a device for storing data (e.g. digital music, video, or advertisements); a distribution engine 616, a mechanism for determining when and what content to distribute to a subscriber 622, 624, and/or 626 via the content distribution channels 620; and a communication bus 617, linking the watchdog 615 and the content archive 614. Both the content receiver 612 and the distribution engine 616 communicate with the watchdog 615. The watchdog 615 communicates with the content archive 614.

The infrastructure for distributing content from producers, through distributors, to subscribers shown in FIGS. 5 and 6 may be used in conjunction with a trusted watchdog (515, 615, respectively) performing not only passive monitoring, but active interception and processing of a producer set as well. The watchdog 615 of FIG. 6, is shown communicating with the content archive 614 via the communication bus 617. Hence, the watchdog 615 may access any data (e.g. digital music, movies, and/or advertisements) that is intended for distribution and subsequent receipt by subscribers. The contents of the content archive, however, may not be protected from tampering. Though the watchdog may discern if anything in the content archive had been tampered with, the watchdog may not be able to prevent such tampering. Therefore, for purposes of security, data, information, and/or programs stored in the content archive may be analyzed by the watchdog. Additionally, the watchdog may absorb, fully or partially, the functionality of the distribution engine, thus increasing the flexibility of the watchdog in monitoring and controlling the flow of data from distributor to subscriber.

The producer prepares a producer set. The producer set may include: raw data, to be transformed into distribution content, a distribution selection program for selecting distributor specific information from the data, and a distributor transformation program for processing the data for receipt by a distributor. The distributor transformation program prepares a distributor set. The distributor set may include: raw data, to be transformed into content for a subscriber, a subscriber selection program, for selecting subscriber specific information from the data, and a subscriber transformation program for customizing the data sent to individual subscribers.

The watch dog receives a producer set, logs the receipt, and executes the distribution selection program to determine if a particular distributor is to receive the data. The watchdog may store some of the data of the producer set in the content archives For example, an advertisement may be packaged by a producer for a particular retail chain store with information that specifies that the advertisement applies only to store locations in a pre-specified area. The selection program determines if a particular distributor is in the pre-specified area or not, and whether or not to distribute the advertisement to subscribers.

If a distributor is to receive the data, the watchdog executes the distributor transformation program to prepare content for the distributor's site. If the transformation is successful the watchdog may store some information or data in a content archive and retain some information or data internally. An unsuccessful transformation may take several forms, including: content not meant for distribution to a particular distributor and/or an associated set of subscribers, incorrect content, and unsecure program(s) included in the data. In case of an unsuccessful transformation the watchdog may log the event and/or discard the data, possibly notifying the producer and/or the distributor of the failure.

The distribution engine, or alternatively the watchdog, decides when some content is to be distributed, and the watchdog selects and executes a subscriber selection program. The watchdog may retrieve data and information stored in the content archive. The decision to distribute content may be based on several inputs. For example, the time and date, expiration of content and/or subscriber selection programs, and stored records of distribution content. The watchdog then executes a subscriber transformation program. Both distributor and subscriber transformation programs customize data for the particular use of subscribers. These transformation programs may control, for example, the language of a voice/sound track to be distributed, depending on the ethnic makeup of the target subscribers. These programs may additionally control, for example, the volume level of the voice/sound track to be distributed to subscribers, depending on factors like the age group of the subscribers. Note that selection and transformation programs may be internal to a watchdog, loaded into a watchdog, and/or stored in a content archive. Furthermore, the distribution log may contain information describing what selection and transformation programs were applied to which content.

The selection programs may use information that is fed-back to a distributor's site from subscriber sites. This information feedback may be used by the watchdog to customize distribution content. For example, if a subscriber is searching the Internet for information about running, a watchdog may select advertisements (content) for the subscriber (for insertion in the Web pages viewed by the subscriber) that are related to running; e.g. advertisements for running shoes.

The following table illustrates some examples of transformation and selection for both the art and advertising categories of content.

|  | Art | Advertising |
| --- | --- | --- |
| Distributor Selection | Select which hotels of a chain of hotels are to receive what set of movies. Shut off access to movies for hotels that have not paid the producer. | Select which cable-TV companies are to receive what set of advertisements. Block transmission of particular advertisements to particular cable-TV companies. |
| Distributor Transformation | Embed cryptographic watermark in movies based on a hotel's identity. | Change the language of an advertisement depending on the distributor's location. |
| Subscriber Selection | Authenticate a subscriber by verifying a digital signature against a certificate containing a public encryption key. | Change advertisement sent to subscriber based on the time of day. Block advertisements for producers who have not paid distributor. Resolve contention between two advertisers competing for one slot. |
| Subscriber Transformation | Embed subscriber and distributor identifies in a cryptographic watermark. | Change set of goods advertised by a retailer based on an inferred interest (e.g. referrer field, cookies, content of Web page) of a subscriber. |

To communicate to a watchdog whether or not content had actually reached the subscriber in the appropriate demographic class, and/or whether content had reached a subscriber at all, a watchdog computer system may be equipped with watchpuppies. The watchpuppies are trusted devices residing in subscriber's sites. Watchpuppies installed in all or some of the subscriber sites may work in concert with a watchdog installed at a distributors site. The watchpuppies may further provide information that is helpful in distinguishing subscribers that are human from subscribers that are automatons, e.g. web search engines. In addition, the watchpuppies may assist in monitoring user-to-cached-copy interactions of subscribers as well as server-to-cache interactions. A watchpuppy may be implemented by, for example, the IBM 4758 cryptographic coprocessor, IBM MultiFunction Card (IBM MFC 4.0 smart card), as well as smart cards from Schlumberger and other vendors, such as smart cards supporting standards for security cards like the ISO-7816 set of standards. Alternatively, subscriber sites may be provided with all of the functionality of a computer watchdog system.

A watchdog may embed data intended for a watchpuppy, into the content to be distributed. The watchpuppy may then scan all incoming content for such embedded data and log the receipt of the data. Hence, the watchpuppy may verify that distributed content was actually received by subscribers. A channel between the distributor and the subscriber may be secured by utilizing a security protocols for communications between a watchdog and a watchpuppy. A security protocol such as, for example, IPSEC, see RFC 1825: Security Architecture for the Internet Protocol, Naval Research Lab, August 1995, RFC 1826: IP Authentication Header, Naval Research Lab, August 1995, RFC 1827: IP Encapsulating Security Payload (ESP), Naval Research Lab, August 1995; SSL, see The SSL Protocol, by K. E. B Hickman (developed my Netscape Communications Corporations), December 1995, The IETF's internet draft: HTTP Over TLS, dated March 1998; or the like may be used. Such a protocol may be more secure than a software-only implementation, because of the tamper resistant nature of the watchdog and watchpuppy. Moreover, the implementation of a security protocol may result in better performance due to hardware acceleration of cryptographic algorithms within the watchdog and watchpuppy.

Although illustrated and described herein with reference to certain exemplary embodiments, the present invention is nevertheless not intended to be limited to the details shown. Rather, various modifications may be made in the details within the scope and range of equivalents of the claims and without departing from the spirit of the invention.

What is claimed:

1. A computer watchdog system for processing a producer set provided by a producer, the computer watchdog comprising:
    a processing engine for creating a plurality of records of distribution content and for generating a plurality of reports based on the producer set;
    a distribution log for storing the plurality of records of distribution content;
    an authenticated execution unit for validating a set of operations performed by the processing engine and transmitting an authenticating signal responsive to said set of operations being validated; and
    tamper protection means for detection of unauthorized access to the computer watchdog system by detecting one of a plurality of tamper indicators, wherein the plurality of tamper indicators include at least one of: temperature change, voltage change, presence of X-rays, physical intrusion.

2. A computer watchdog system as recited in claim 1, wherein the processing engine includes means for preparing a distributor set by selectively transforming the producer set.

3. A computer watchdog system as recited in claim 2, wherein the processing engine includes means for customizing the distributor set by selectively transforming the distributor set into subscriber data.

4. A computer watchdog system as recited in claim 1, further comprising a watchpuppy for verifying ones of the plurality of records of distribution content.

5. A computer watchdog system as recited in claim 1, wherein the plurality of records of distribution content each include a unique identifier of content.

6. A computer watchdog system as recited in claim 1, wherein the plurality of records of distribution content each include at least one of: time of data receipt, date of data receipt, size of data, length of data transmission, format of content, identity of distributor, identity of subscribers.

7. A computer watchdog system as recited in claim 1, further comprising tamper protection for preventing unauthorized access to the computer watchdog system by modifying portions of system memory.

8. A computer watchdog system as recited in claim 1, wherein each of the plurality of reports include at least one of the plurality of records of distribution content stored in the distribution log.

9. A computer watchdog system as recited in claim 1, wherein each of the plurality of reports include at least one of: time of data receipt, date of data receipt, size of data, length of data transmission, format of content, identity of distributor, identity of subscribers.

10. A computer watchdog system as recited in claim 1, wherein the producer set includes: data, at least one of a plurality of distributor selection instructions, at least one of a plurality of distributor transformation instructions.

11. A computer watchdog system as recited in claim 10, wherein ones of the plurality of distributor selection instructions selects ones of a plurality of distributors based on data included in the producer set.

12. A computer watchdog system as recited in claim 10, wherein ones of the plurality of distributor transformation instructions embed a cryptographic watermark in data included in the producer set.

13. A computer watchdog system as recited in claim 10, wherein ones of the plurality of distributor transformation instructions produce at least one of: subscriber data, at least one of a plurality of subscriber selection instructions, at least one of a plurality subscriber transformation instructions.

14. A computer watchdog system as recited in claim 13, wherein ones of the plurality of subscriber selection instructions authenticate a subscriber by verifying a digital signature against an encryption key.

15. A computer watchdog system as recited in claim 13, wherein ones of the plurality of subscriber transformation instructions embed subscriber and distributor identities in a cryptographic watermark.

16. A method of processing a producer set provided by a producer to a distributor for distribution to a subscriber, comprising the steps of:
    locating at the distributor's location a computer watchdog system for:
        creating a plurality of records of distribution content;
        generating a plurality of reports based on the producer set;
        storing the plurality of records of distribution content;
        validating a set of operations performed on the producer set;
        transmitting an authenticating signal to the producer on a watchdog-producer communication loop if said set of operations are validated; and
    detecting unauthorized access to the computer watchdog by being responsive to a plurality of tamper indicators which include at least one of temperature change, presence of X-rays, and physical intrusion.

17. A method of processing a producer set according to claim 16, further comprising the step of preparing a distributor set by selectively transforming the producer set.

18. A method of processing a producer set according to claim 17, further comprising the step of customizing the distributor set by selectively transforming the distributor set into subscriber data.

19. An article of manufacture comprising a computer usable medium having computer readable program code means embodied therein for processing a producer set provided by a producer to a distributor for distribution to a subscriber, the computer readable program code means in said article of manufacture comprising computer readable program code means for causing a computer watchdog to effect:

(a) creating a plurality of records of distribution content;

(b) generating a plurality of reports based on the producer set;

(c) storing the plurality of records of distribution content;

(d) validating a set of operations performed on the producer set;

(e) transmitting an authenticating signal if said set of operations are validated; and (f) providing tamper protection for detecting unauthorized access to the computer watchdog by being responsive to a plurality of tamper indicators including at least one of temperature change, presence of X-rays, and physical intrusion.

20. An article of manufacture as recited in claim 19, the computer readable program code means in said article of manufacture further comprising computer readable program code means for causing a computer to effect:

preparing a distributor set by selectively transforming the producer set.

21. An article of manufacture as recited in claim 20, the computer readable program code means in said article of manufacture further comprising computer readable program code means for causing a computer to effect:

customizing the distributor set by selectively transforming the distributor set into subscriber data.

22. A computer program product comprising a computer usable medium having computer readable program code means embodied therein for causing processing a producer set provided by a producer to a distributor for distribution to a user, the computer readable program code means in said computer program product comprising computer readable program code means for causing a watchdog computer located at the distributor's location to effect:

(a) creating a plurality of records of distribution content;

(b) generating a plurality of reports based on the producer set;

(c) storing the plurality of records of distribution content;

(d) validating a set of operations performed on the producer set;

(e) transmitting in response to a producer query an authenticating signal on a watchdog-producer communication loop if said set of operations are validated; and providing tamper protection for detection of unauthorized access to the computer watchdog by being responsive to a plurality of tamper indicators including at least one for temperature, change, presence of X-rays and physical intrusion.

23. A computer program product as recited in claim 22, the computer readable program code means in said computer program product further comprising computer readable program code means for causing a computer to effect:

preparing a distributor set by selectively transforming the producer set.

24. A computer program product as recited in claim 23, the computer readable program code means in said computer program product further comprising computer readable program code means for causing a computer to effect:

customizing the distributor set by selectively transforming the distributor set into subscriber data.

25. A storage device readable by machine, tangibly embodying a program of instructions executable by the machine to perform method steps for processing a producer set provided by a producer to a distributor for distribution to a subscriber, said method comprising the steps of:

(a) creating a plurality of records of distribution content;

(b) generating a plurality of reports based on the producer set;

(c) storing the plurality of records of distribution content;

(d) validating a set of operations performed on the producer set;

(e) transmitting an authenticating signal is said set of operations are validated; and (f) providing tamper protection for the detection of unauthorized access to the computer watchdog by being responsive to a plurality of tamper indicators including at least one for temperature change, presence of X-rays and physical intrusion.

26. A computer watchdog system for processing a set of advertisements provided by an advertiser and distributed by a distributor, characterized by a computer watchdog located at the distributor's site comprising:

a processing engine for creating a plurality of records of distributed advertisements and for generating a plurality of reports based on the set of advertisements;

a distribution log for storing the plurality of records of distributed advertisements;

an authenticated execution unit for validating a set of operations performed by the processing engine and transmitting an authenticating signal responsive to said set of operations being validated;

a watchdog-producer communication loop through which the producer may query the watchdog; and tamper protection to detect unauthorized access to the computer watchdog by being responsive to a plurality of tamper indicators.

27. A computer watchdog system as recited in claim 26, wherein the processing engine includes means for preparing a cable TV distribution set by selecting ones of the set of advertisements and changing the language of ones of the set of advertisements.

28. A computer watchdog system for processing a producer set provided by a producer to a distributor for distribution to a user, characterized by a computer watchdog at the distributor's location comprising:

a processing engine for creating a plurality of records of distribution content and for generating a plurality of reports based on the producer set;

a distribution log for storing the plurality of records of distribution content;

an authenticated execution unit for validating a set of operations performed by the processing engine and transmitting an authenticating signal responsive to said set of operations being validated; and tamper protection logic for detecting unauthorized access to the computer watchdog system by detecting one of a plurality of tamper indicators, wherein the plurality of tamper indicators include at least one of: temperature range, voltage change, presence of X-rays, physical intrusion.

29. In a computer watchdog system for processing a producer set provided by a producer to a distributor for distribution to a user characterized by, a computer watchdog at the distribution location comprising:

a processing engine for creating a plurality of records of distribution content and for generating a plurality of reports based on the producer set;

a distribution log for storing the plurality of records of distribution content;

an authenticated execution unit for validating a set of operations performed by the processing engine that either reside in the computer watchdog system or are sent to the computer watchdog system by the producer or by a distributor, and transmitting an authenticating signal responsive to said set of operations being validated;

a watchdog-producer communication loop through which the producer can query the watchdog; and tamper protection logic responsive to unauthorized access to the computer watchdog.

* * * * *